(12) United States Patent
Zachary et al.

(10) Patent No.: US 10,661,449 B2
(45) Date of Patent: May 26, 2020

(54) SAFE ROBOTIC TOOL CHANGER

(71) Applicant: ATI Industrial Automation, Inc., Apex, NC (US)

(72) Inventors: Kyle Zachary, Fuquay Varina, NC (US); Mack Earl Manning, Apex, NC (US); Daniel Allen Norton, Cary, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 492 days.

(21) Appl. No.: 14/939,113

(22) Filed: Nov. 12, 2015

(65) Prior Publication Data

US 2016/0059424 A1    Mar. 3, 2016

Related U.S. Application Data

(63) Continuation-in-part of application No. 14/749,708, filed on Jun. 25, 2015.

(Continued)

(51) Int. Cl.
| | |
|---|---|
| *B23B 31/30* | (2006.01) |
| *B23B 31/107* | (2006.01) |
| *B25J 15/04* | (2006.01) |
| *B23Q 1/00* | (2006.01) |

(52) U.S. Cl.
CPC ....... *B25J 15/0416* (2013.01); *B23B 31/1071* (2013.01); *B23B 31/30* (2013.01);
(Continued)

(58) Field of Classification Search
CPC ... B23B 31/1071; B23B 31/30; B23B 31/302; B23B 2260/128; B23Q 1/0072;
(Continued)

(56) References Cited

U.S. PATENT DOCUMENTS

| | | | |
|---|---|---|---|
| 3,788,658 A | * | 1/1974 | Benjamin ............... B23B 31/06 279/155 |
| 4,636,135 A | | 1/1987 | Bancon |

(Continued)

FOREIGN PATENT DOCUMENTS

| | | | | |
|---|---|---|---|---|
| DE | 29711064 U1 | * | 2/1998 | ......... B23B 31/1071 |
| EP | 1245348 A1 | | 10/2002 | |

(Continued)

OTHER PUBLICATIONS

Translation, WIPO document, Description of WO 2015074710, Kohler W., May 28, 2015.*

*Primary Examiner* — Eric A. Gates
*Assistant Examiner* — Chwen-Wei Su
(74) *Attorney, Agent, or Firm* — Coats & Bennett, PLLC (57) ABSTRACT

In an inherently safe robotic tool changer, a master unit couples to a tool unit via a first power source, and decouples from the tool unit using a separate, second power source. The second power source is only available when an attached tool is safely disposed in a tool stand. In embodiments where the first power source is not selectively applied, such as the constant bias provided by a spring, a detent mechanism maintains the master unit in a decoupled state when the master unit is removed from the tool unit. The detent mechanism allows the master unit to couple to a different tool unit upon physically abutting the new tool unit.

15 Claims, 9 Drawing Sheets

Related U.S. Application Data (60) Provisional application No. 62/039,848, filed on Aug. 20, 2014, provisional application No. 62/067,200, filed on Oct. 22, 2014.

(52) U.S. Cl.
CPC ....... B25J 15/0466 (2013.01); B25J 15/0491 (2013.01); *B23Q 1/0072* (2013.01); *Y10S 279/906* (2013.01); *Y10T 279/17145* (2015.01)

(58) Field of Classification Search
CPC .......... B25J 15/0416; B25J 15/0466; B25J 15/0491; Y10T 279/17145; Y10T 279/17752; Y10T 279/17196; Y10S 279/905; Y10S 279/906
See application file for complete search history.

(56) References Cited

U.S. PATENT DOCUMENTS

| | | | |
|---|---|---|---|
| 4,793,053 A * | 12/1988 | Zuccaro | B25J 15/04 279/4.01 |
| RE32,854 E * | 2/1989 | McCormick | B23Q 1/0009 279/4.06 |
| 4,826,230 A | 5/1989 | Truchet | |
| 5,211,501 A | 5/1993 | Nakamura et al. | |
| 6,101,888 A * | 8/2000 | Yonezawa | B25B 5/06 269/138 |
| 6,457,916 B2 * | 10/2002 | Wienhold | B25B 15/001 279/155 |
| 7,156,795 B2 | 1/2007 | Nolte et al. | |
| 7,252,453 B1 | 8/2007 | Little | |
| 8,005,570 B2 | 8/2011 | Gloden et al. | |
| 8,132,816 B2 * | 3/2012 | Norton | B23B 31/1071 279/134 |

FOREIGN PATENT DOCUMENTS

| | | |
|---|---|---|
| JP | H05169382 A | 7/1993 |
| JP | H06218686 A | 8/1994 |
| JP | H06246570 A | 9/1994 |
| JP | 2004148470 A | 5/2004 |
| WO | 2015074710 A1 | 5/2015 |

\* cited by examiner

SAFE ROBOTIC TOOL CHANGER

CROSS-REFERENCE TO RELATED APPLICATIONS

This application is a continuation-in-part of U.S. patent application Ser. No. 14/749,708, filed Jun. 25, 2015, which claims the benefit of U.S. Provisional Patent Application Nos. 62/039,848, filed Aug. 20, 2014, and 62/067,200, filed Oct. 22, 2014, all of which are hereby incorporated by reference as if fully set forth herein.

FIELD OF THE INVENTION

The present invention relates generally to robotics, and in particular to an inherently safe robotic tool changer with a mechanism to remain in an unlocked state when not coupled.

BACKGROUND

Industrial robots have become an indispensable part of modern manufacturing. Whether transferring semiconductor wafers from one process chamber to another in a cleanroom or cutting and welding steel on the floor of an automobile manufacturing plant, robots perform many manufacturing tasks tirelessly, in hostile environments, and with high precision and repeatability.

In many robotic manufacturing applications, it is cost-effective to utilize a relatively generic robot arm to accomplish a variety of tasks. For example, in an automotive manufacturing application, a robot arm may be utilized to cut, grind, or otherwise shape metal parts during one phase of production, and perform a variety of welding tasks in another. Different welding tool geometries may be advantageously mated to a particular robot arm to perform welding tasks at different locations or in different orientations.

In these applications, a tool changer is used to mate different tools to the robot. One half of the tool changer, called the master unit, is permanently affixed to a robot arm. The other half, called the tool unit, is affixed to each tool that the robot may utilize. When the robot arm positions the master unit adjacent a tool unit connected to a desired tool, a coupling mechanism is actuated that mechanically locks the master and tool units together, thus affixing the tool to the end of the robot arm. The tool changer thus provides a consistent mechanical interface between a robot arm and a variety of robotic tools. A tool changer may also pass utilities to a tool.

Robotic tools may require utilities, such as electrical current, air pressure, hydraulic fluid, cooling water, electronic or optical data signals, and the like, for operation. Connections to these utilities may be unwieldy, or even unsafe, in operation. Additionally, if two or more tools require the same utilities, a dedicated connection to each tool would be duplicative. Accordingly, one important function of a robotic tool changer is to provide utility-passing modules. Such modules may be attached to standardized locations on the master and tool units of the robotic tool changer. The modules include mating terminals, valve connections, electrical connectors, and the like, making the utilities available to the selected tool when it is coupled to the robot arm. Many tool changers include one or more standard-sized "flats" about their periphery, to which various utility-passing modules may be attached, as required. Tool changers and utility-passing modules are well known in the robotics arts, and are commercially available, such as from the assignee, ATI Industrial Automation of Apex, N.C.

When not in use, each robotic tool is stored in a special rack, or tool holder, within the operative range of the robotic arm. Robot arm controller software "remembers" where each tool is, and each tool is returned to precisely the same position in its tool holder prior to the tool changer decoupling. Similarly, the robot arm controller software "knows" precisely where the next desired tool is stored, and it positions the master unit of the tool changer (on the robot arm) adjacent the tool unit (on the desired tool), then actuates the tool changer to couple the tool to the robot arm.

Safety is a paramount concern in manufacturing environments. A variety of workplace regulations govern the use of large industrial robots, with heavy tools attached thereto. For example, ISO 13849, "Safety of machinery—Safety related parts of control systems," defines five Performance Levels (PL), denoted A through E. Performance Level D (PLD), mandated for many industrial robotics applications, requires a probability of less than $10^{-6}$ dangerous failures per hour—that is, at least a million hours between dangerous failures.

The most likely dangerous failure, from the perspective of a robotic tool changer and its functionality, is an inadvertent decoupling of the master and tool units, allowing the tool to fall free from the robot arm. This danger has long been recognized, and state-of-the-art robotic tool changer design minimizes the risk. For example, in the event positive coupling power, such as pneumatic pressure, is lost during operation, "failsafe" designs ensure that a tool will not separate from the robot arm. See, e.g., U.S. Pat. Nos. 7,252,453 and 8,005,570, assigned to ATI Industrial Automation, the assignee of the present application.

Besides preventing accidental tool drops resulting from loss of pressure, ATI Industrial Automation has also addressed the safety hazard of software bugs or other hazards presenting a valid "decouple" command to a robotic tool changer at the wrong time, such as when a tool is in use. U.S. Pat. No. 6,840,895 describes an interlock circuit that precludes even a valid "uncouple" command from reaching a coupling mechanism of a robotic tool changer if a tool side safety interlock is not engaged. The tool side safety interlock is automatically engaged whenever the tool is placed in its tool stand, and is disengaged whenever the tool is removed from the tool stand.

Interlock circuits can effectively prevent inadvertent decoupling of a robotic tool changer. However, to meet very stringent safety standards, such as ISO 13849 PLD, critical elements (circuit components, pneumatic valves, and the like) must be redundant. Furthermore, to ensure that the designed redundancy is not illusory, such as if one of the redundant circuits were to fail, monitoring means must be added that constantly ensure all critical elements are not only present, but are fully operational and functional. Such redundancy and monitoring systems add cost, complexity, and weight to a robotic tool changer.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a robotic tool changer comprises a master unit operative to connect to a robot arm and a tool unit operative to connect to a robotic tool. A coupling mechanism is disposed in one of the master and tool units, e.g., the master unit, and is operative to selectively couple the master and tool units together. The coupling mechanism requires a first source of power to move to a coupled state and a separate, second source of power to move to decoupled state. The tool changer receives the second power from a tool stand operative to hold the robotic tool when it is separated from the robot. Once the tool is coupled to the robot and removed from the tool stand, the coupling mechanism of the robotic tool changer cannot move to (or even towards) the decoupled state, since the second power source, on the tool stand, is no longer connected to the tool changer. The tool can be decoupled from the robot only when the tool is again returned to the tool stand, and the second power source is available to the robotic tool changer. In this manner, the tool is absolutely prevented from becoming decoupled from the robot unless the tool is properly positioned in its tool stand, with no need for complex, redundant interlock circuits, or monitoring circuits. In embodiments in which the first source of power is not selectively applied, for example, which it comprises mechanical bias from a spring, a detent mechanism maintains the coupling mechanism in the decoupled state when the master unit and tool unit are separated. The detent mechanism allows the master unit to couple to a different tool unit upon physically abutting it.

One embodiment relates to a master unit of a robotic tool changer. The master unit includes a coupling mechanism configured to place the master unit in one of a coupled state and an decoupled state. The coupled state is associated with the master unit being securely coupled to a tool unit of the robotic tool changer and the decoupled state is associated with the master unit being decoupled from a tool unit. The master unit is operative to assume the decoupled state only in response to a tool attached to a coupled tool unit being disposed in a tool stand. The master unit is operative to remain in the decoupled state when decoupled from a tool unit, and is operative to assume the coupled state only in response to physical contact with a tool unit.

Another embodiment relates to a method of operating a master unit of a robotic tool changer having a coupling mechanism configured to place the master unit in one of a coupled state and a decoupled state. The coupled state is associated with the master unit being securely coupled to a tool unit of the robotic tool changer and the decoupled state is associated with the master unit being decoupled from the tool unit. A mechanical force associated with a head of the tool unit is received at the coupling mechanism. In response to receiving the mechanical force, the master unit is released from the decoupled state. In response to releasing the master unit from the decoupled state, the master unit is moved to the coupled state to securely couple the master unit to the tool unit. A second source of power is received, at the coupling mechanism, from the tool unit. In response to receiving the second source of power from the tool unit, the master unit is placed in the decoupled state to decouple the master unit from the tool unit.

Still another embodiment relates to a tool unit of a robotic tool changer. The tool unit includes a head configured to couple to a coupling mechanism of a master unit of the robotic tool changer so as to apply mechanical force to the coupling mechanism, wherein the mechanical force is used to release the master unit from a decoupled state and allow the master unit to securely couple to the tool unit. The tool unit also includes a fluid port configured to couple to a fluid receptacle of the master unit so as to apply a second source of power to the coupling mechanism, wherein the second source of power is used to place the master unit in a decoupled state and decouple from the tool unit. The tool unit further includes an alignment post configured to radially align the tool unit to the master unit of the robotic tool changer as the master and tool units couple, so that the fluid port is disposed in and coupled to the fluid receptacle of the master unit.

Yet another embodiment relates to a method of operating a tool unit of a robotic tool changer having a head, an alignment port and a fluid port. The head is disposed in an opening of a master unit of the robotic tool changer when the master unit is in a decoupled state. The head is coupled to a coupling mechanism of the master unit. The alignment post is disposed in an alignment receptacle of the master unit so that the tool unit is radially aligned with the master unit with the fluid port disposed in a fluid receptacle of the master unit. Mechanical force associated with the head is applied to the coupling mechanism of the master unit to release the master unit from a decoupled state and allow the master unit to securely couple to the tool unit. While coupled to the master unit, a second source of power is applied to the coupling mechanism of the master unit, from the fluid port of the tool unit to the fluid receptacle of the master unit, so that the master unit is placed into the decoupled position and decoupled from the tool unit.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for a robotic tool changer. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The terms "couple" and "decouple," used as verbs, mean to directly or indirectly join one unit, function, feature, structure, or characteristic to or in communication with another unit function, feature, structure, or characteristic. The terms "coupled state" and "decoupled state" refer to different states, modes, or conditions of a master unit and/or a coupling mechanism in the master unit. The terms "locked position" and "unlocked position" are terms of reference, referring to different terminal positions of moveable pistons. Relational terms such as "first" and "second," and the like may be used solely to distinguish one entity or action from another entity or action without necessarily requiring or implying any numerical relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

In the embodiments depicted in the accompanying figures, the coupling mechanism, disposed in the master unit, comprises a coupling piston that moves axially to drive a plurality of rolling members radially (either inwardly or outwardly) to contact a surface of the tool unit to couple the master and tool units together. Separate power delivery means are required to advance the coupling piston toward a locked position, in which the coupling mechanism is in the coupled state, an unlocked position, in which the coupling mechanism is in the decoupled state. The power delivery means to drive the coupling piston toward the locked position may comprise a source of pneumatic fluid, for example routed through the robotic arm to the master unit. Alternatively, as in embodiments depicted herein, the power delivery means to drive the coupling piston toward the locked position may comprise mechanical springs. In all embodiments, the decoupling power delivery means comprises a source of pneumatic fluid that is at least partially disposed on a tool stand, in such a manner that the tool must be placed in the tool stand for the coupling mechanism to receive the pneumatic fluid necessary to move the coupling piston to the unlocked position, so as to decouple the master and tool units.

The master unit also includes a pneumatic fluid pass-through port, through which it receives pressurized air from the tool unit when the master and tool unit are abutting. This port directs pneumatic fluid to one the side of the coupling piston, where it drives the piston toward the unlocked position. Accordingly, when the master unit is decoupled from, and not physically adjacent, the tool unit, the coupling piston cannot move to the unlocked state.

The tool unit includes a corresponding pneumatic fluid pass-through port operative to mate to the pneumatic fluid pass-through port on the master unit, when the master unit is aligned with and physically abutting (or coupled to) the tool unit. When so mated, pneumatic fluid from the tool stand passes from the tool unit into the master unit, where it provides power to move the coupling piston to the unlocked state. A pneumatic fluid source may be on, or associated with, the tool stand. Alternatively, pneumatic fluid received by the master unit may be passed through the tool, through a "loop back" path on the tool stand, and back into the tool unit. In either case, the fluid path from the unlock side of the coupling piston, through the master and tool units, mates with a pneumatic fluid coupling on the tool stand.

The tool unit further includes a pneumatic fluid supply port through which receives pressurized air from a source on (or routed through) a tool stand. When the tool is safely disposed in the tool stand, the pneumatic fluid supply port couples to the source on (or routed through) the tool stand, and pressurized air is available within the tool unit. The pneumatic fluid supply port and pneumatic fluid pass-through port on the tool unit are connected in pneumatic fluid relationship. In some embodiments, control elements such as one or more valves may be interposed between the pneumatic fluid supply port and pneumatic fluid pass-through port, to control the flow of air through the tool unit. In one embodiment, the pneumatic fluid supply port and pneumatic fluid pass-through port on the tool unit are connected by a free-flowing air passageway.

In all embodiments, pneumatic fluid from the tool stand is operative to flow into the pneumatic fluid supply port, through the tool unit, out the pneumatic fluid pass-through port, thence flow into the pneumatic fluid pass-through port on the master unit, and to one side of the coupling piston to drive the piston towards the unlocked position. When the master unit is decoupled from (and not physically abutting) the tool, the coupling piston cannot move towards the unlocked position. Additionally, and critically, once the master and tool units are coupled, and the tool is removed from the tool stand, no pneumatic fluid flows through the tool unit, and hence into the master unit, to move the coupling piston toward the unlocked position. Even if all electronic controls, commands from a control system, and the like, indicate that the tool changer coupling mechanism should decouple, no physical decoupling can occur due to no source of power to actuate the coupling mechanism to the unlocked state.

This decoupling mechanism is inherently safe; it prevents the tool from decoupling from the robot arm unless the tool is safely disposed in a tool stand. In embodiments where pneumatic fluid also drives the coupling piston to the locked position, when the robot arm deposits a tool in a tool stand and the coupling mechanism decouples, as the robot arm moves away from the tool, the coupling mechanism remains in the decoupled state, as no pneumatic fluid is directed to the coupling piston to move it toward the locked state. The robot arm may then move adjacent its next tool, and the coupling piston may then be moved to the locked state by applying pneumatic fluid.

In some embodiments, however, simple mechanical springs may be employed to drive the coupling piston toward the locked state. Springs have several advantages over a pneumatic fluid drive. For example, system costs may be reduced if a pneumatic source need not be provided for each robot arm (pneumatic fluid may simply be supplied to each tool stand to drive the decouple operation). Additionally, springs are inherently safer, as they continuously bias the piston toward the locked position; a pneumatic system may fail, in which case there is no active pressure driving the coupling piston to remain locked. Additionally, the design and manufacture of the master unit may be easier and cheaper, as it will require fewer pneumatic couplings, valves, O-rings, and the like.

In embodiments where the coupling piston is driven by springs, once the robot arm has deposited the tool in the tool stand, and the coupling piston is moved to the unlocked position by pneumatic fluid received from (or through) the tool stand, when the robot arm then moves away from the tool, the coupling piston will advance to the fully locked state under bias from the springs. To then couple to another tool, the coupling mechanism must be moved and held in the decouple position, so that it can mate with another tool unit on another tool.

According to embodiments of the present invention, another piston-and-ball mechanism is employed to lock the coupling piston in the unlocked position when the master unit is moved away from a tool unit. This piston—referred to herein as a detent piston—may also be spring-actuated. The detent piston may be moved to an unlock position by physical contact with a tool unit, which allows the coupling piston to move to the locked position, coupling the tool to the robot arm.

Figure 1:
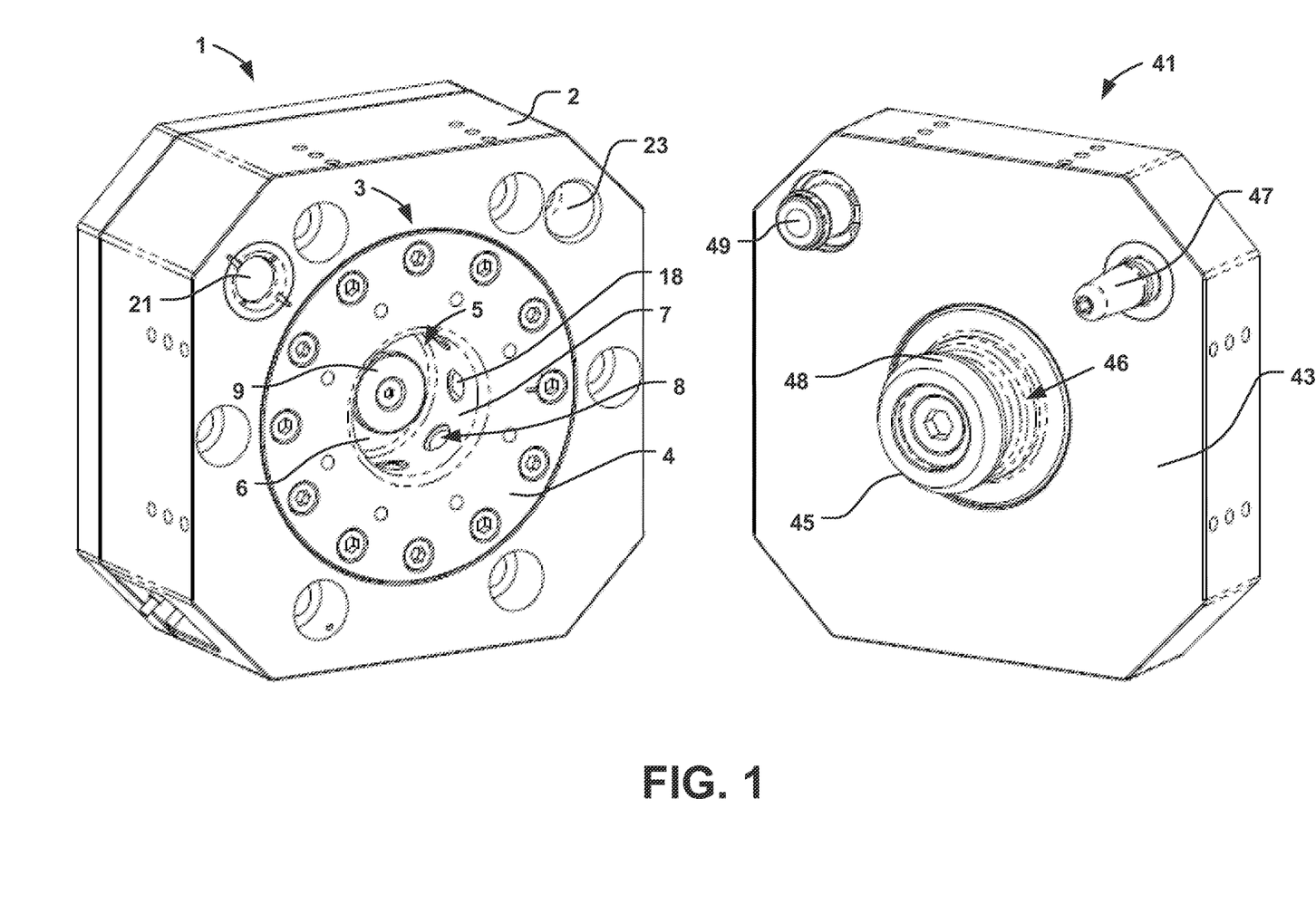
FIG. 1 provides a perspective view of one embodiment of a tool unit and a master unit of a robotic tool changer in accordance with various aspects as described herein.
Figure 2:
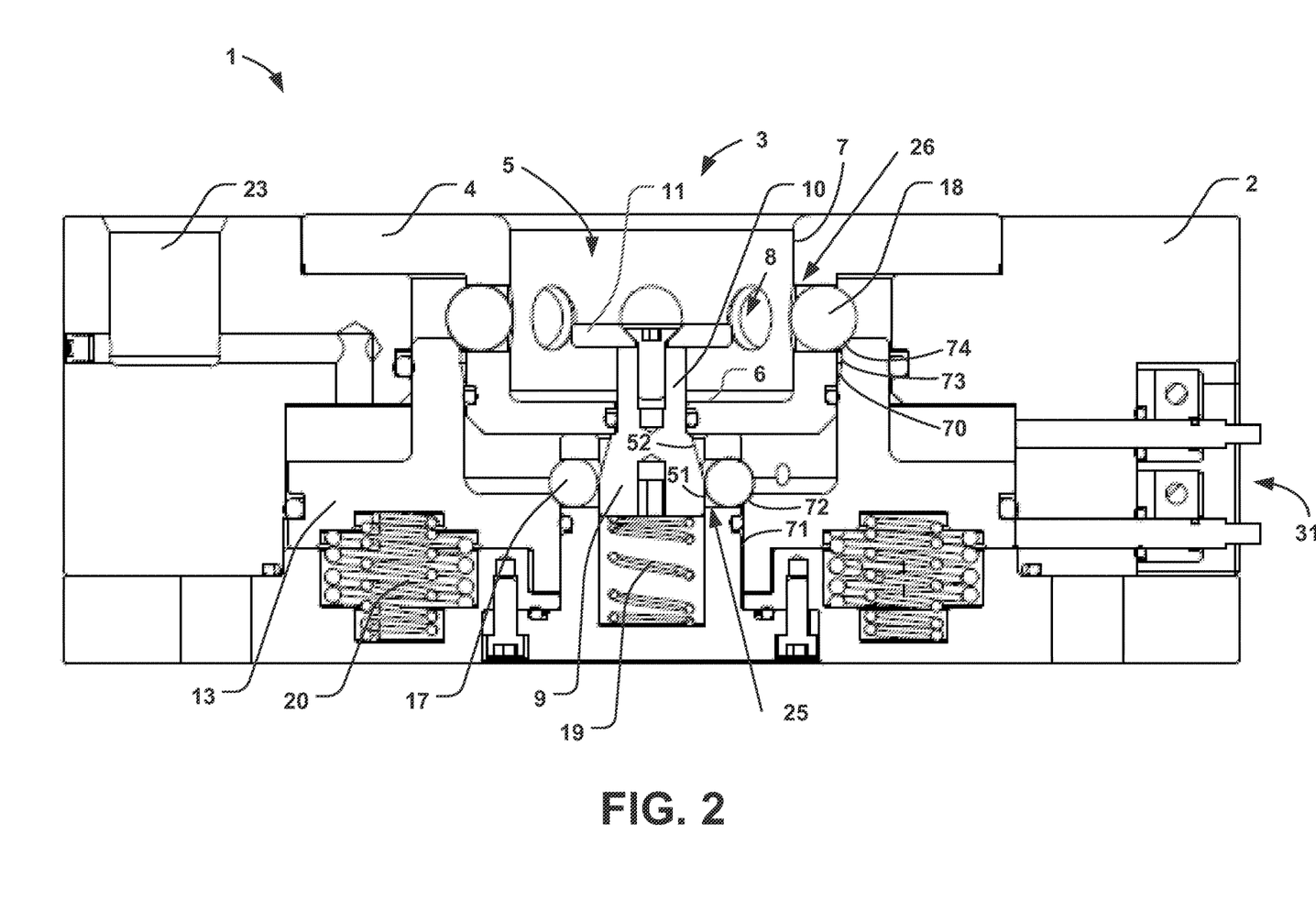
FIG. 2 provides a longitudinal cross-sectional view of the master unit in a decoupled state in accordance with various aspects as described herein.
Figure 3:
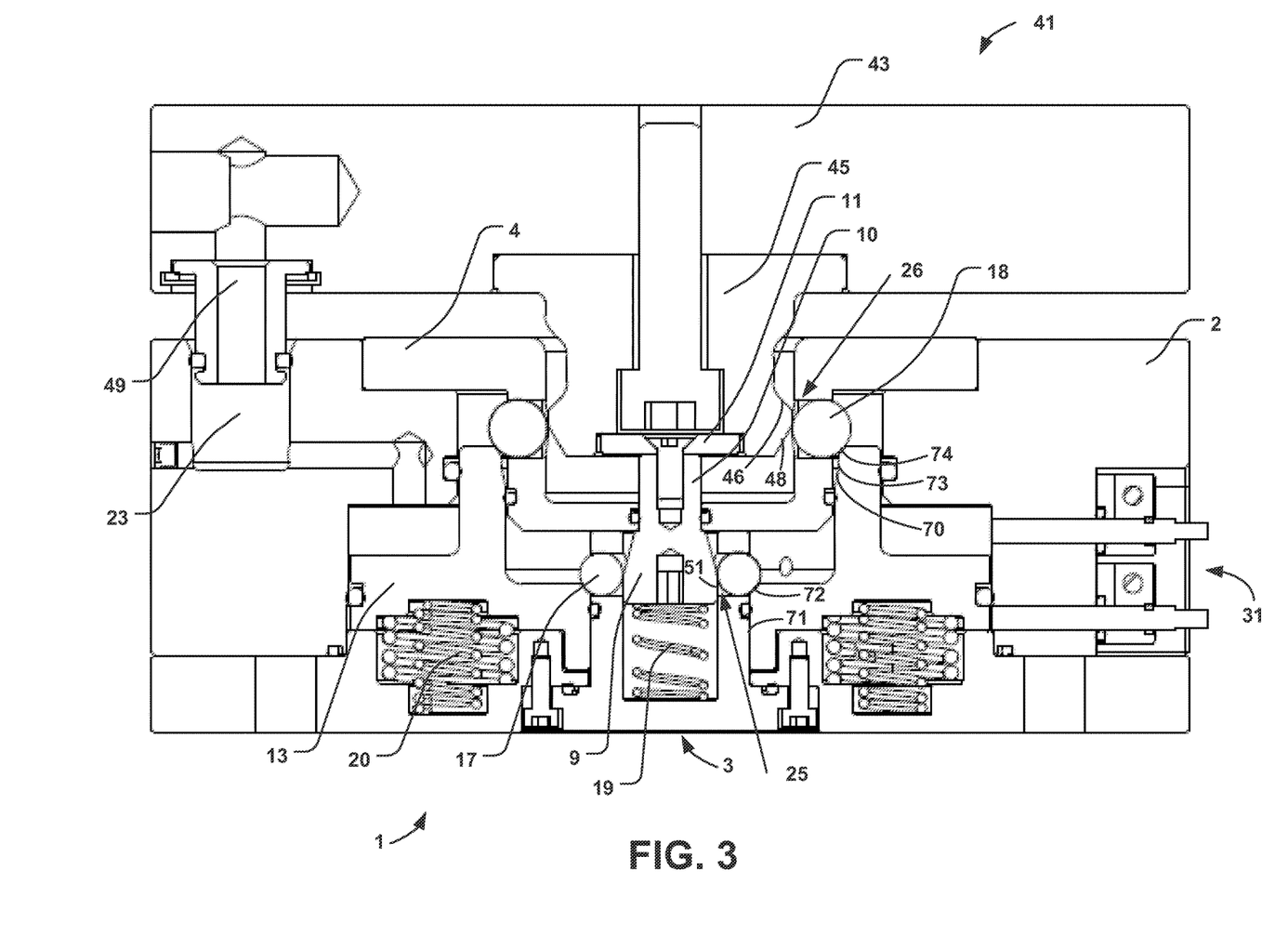
FIG. 3 provides a longitudinal cross-sectional view of the master unit in the decoupled state while coupling with the tool unit in accordance with various aspects as described herein.
Figure 4:
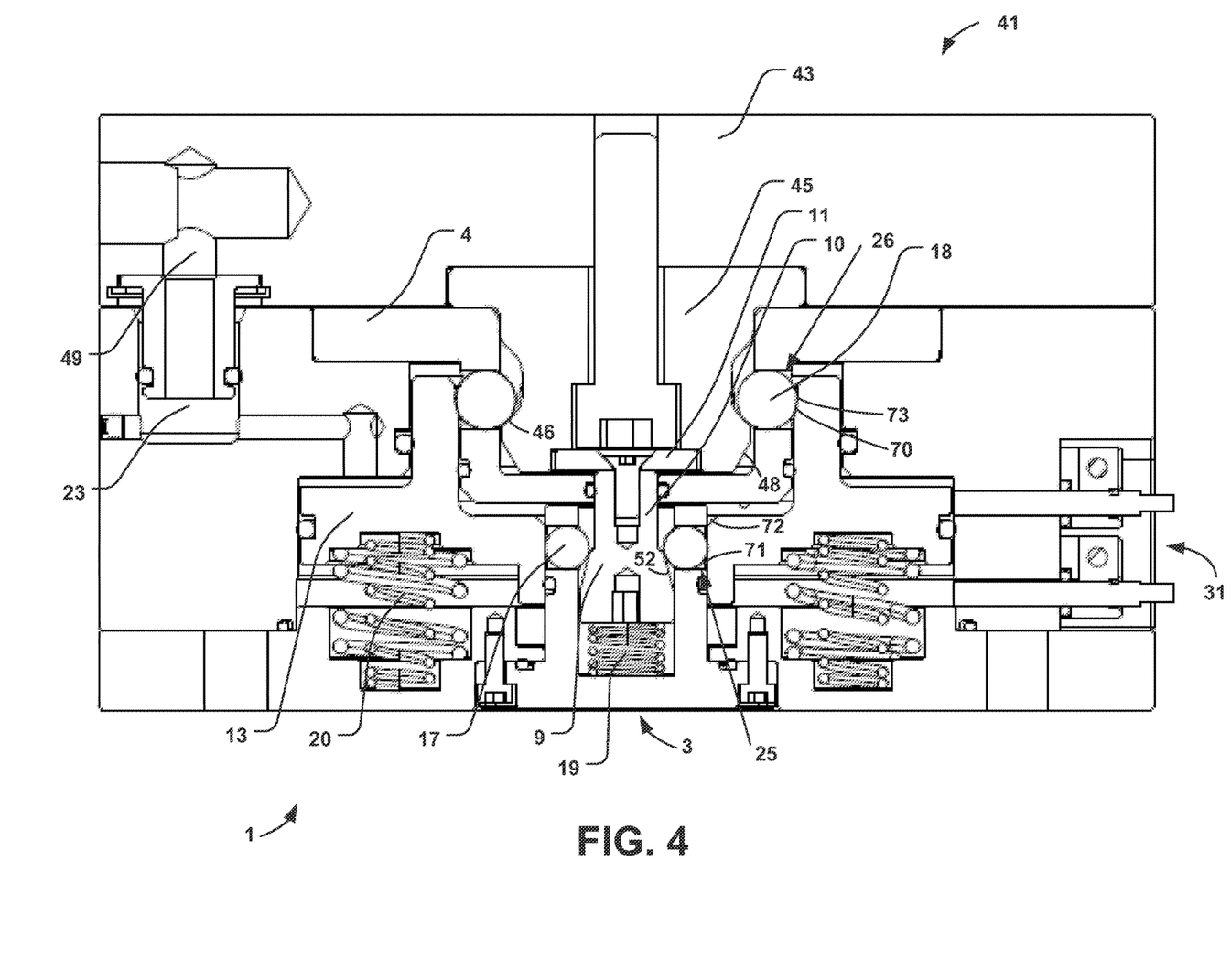
FIG. 4 provides a longitudinal cross-sectional view of the master unit in a coupled state and securely coupled to the tool unit in accordance with various aspects as described herein.
Figure 5:
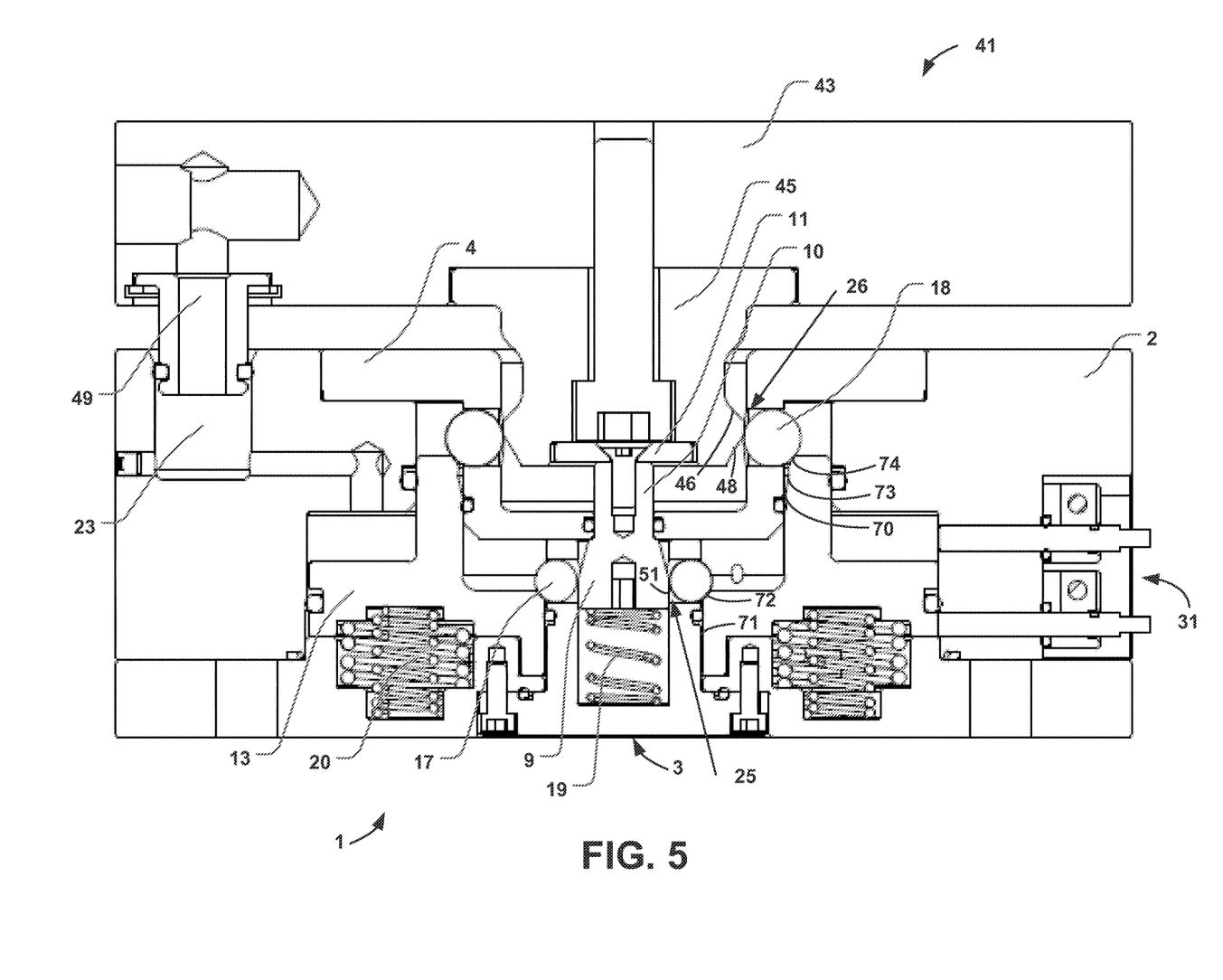
FIG. 5 provides a longitudinal cross-sectional view of the master unit in the decoupled state while decoupling from the tool unit in accordance with various aspects as described herein.

FIG. 1 provides a perspective view of one embodiment of a master unit 1 and a tool unit 41 of a robotic tool changer in accordance with various aspects as described herein. Further, FIGS. 2 to 5 provide longitudinal cross-sectional views of the master unit 1 in various states; some figures include the tool unit 41. FIG. 2 shows the master unit 1 in an unlocked state. FIG. 3 shows the master unit 1 in the coupled state while coupling to the tool unit 41. FIG. 4 shows the master unit 1 in a coupled state and securely coupled to the tool unit 41. FIG. 5 shows the master unit 1 in the decoupled state while decoupling from the tool unit 41.

In FIG. 1, the master unit 1 is shown in a decoupled state and is not coupled to the tool unit 41. As shown in FIGS. 1 to 5, the master unit 1 includes a housing 2, a coupling mechanism 3, an alignment receptacle 21, a fluid receptacle 23 and a sensor 31.

The coupling mechanism 3 is configured to include a housing 4, an opening 5 in the housing 4, with one or more apertures 8 in a sidewall 7 of the opening 5, a detent piston 9, one or more detent balls 17, a detent piston actuating spring 19, a detent ball retaining area 25, a coupling piston 13, one or more coupling balls 18, a coupling piston actuating spring 20, and a coupling ball retaining area 25. The opening 5 in the housing 4 of the coupling mechanism 3 includes a floor 6 and a sidewall 7. One or more apertures 8 are formed in the sidewall 7, slightly smaller in diameter than the diameter of the coupling ball 18, allowing the coupling ball 18 to partially protrude, but not fully pass, into the opening 5. The detent ball retention area 25 is disposed between the detent piston 9 and the coupling piston 13. The coupling ball retention area 26 is disposed between the coupling piston 13 and aperture 8 in the sidewall 7 of the opening 5. Although depicted and referred to herein as balls, the detent ball 17 and coupling ball 18 in other embodiments may comprise cylindrical rolling members. Generally, a plurality of both detent balls 17 and coupling balls 18 are provided and positioned radially around their respective pistons 9, 20. Similarly, a plurality of coupling piston actuating springs 20 may be provided. The number, size, and placement of the detent balls 17, coupling balls 18, and coupling piston actuating springs 20 will vary with each tool changer. Such details are well within the skill of those skilled in the robotic arts.

The coupling mechanism 3 is operative to place the master unit 1 in one of a coupled state and a decoupled state. In the coupled state, the master unit 1 is locked and securely coupled to a tool unit 41. In the decoupled state, the master unit 1 is unlocked and able to be re-coupled to, or decoupled from, a tool unit 41. A first source of power such as the coupling piston actuating spring 20 is operative to place the master unit 1 in the decoupled state and securely coupled to the tool unit 41 (in other embodiments, the first source of power may be a pneumatic fluid source). A second, separate source of power such as a pneumatic fluid source provided on or routed through a tool stand is operative to place the master unit 1 in the decoupled state with the ability to re-couple to or decouple from a tool unit 41.

The detent piston 9 is axially mounted in the coupling mechanism 3. Further, the detent piston 9 includes a stem 10 and a base 11. The stem 10 of the detent piston 9 may be disposed through and axially moved in an aperture 8 of the floor 6 of the opening 5. The detent piston 9 is biased towards a locked position by the detent piston actuating spring 19. Although depicted and described herein as driven by a spring 19, the detent piston 9 could be driven by pneumatic fluid, a different element capable of storing and applying mechanical energy, or the like. A person of ordinary skill in the art will recognize various techniques for actuating a piston. In addition, the coupling piston 13 is axially mounted in the coupling mechanism 3. The coupling piston 13 is biased toward the locked position by one or more coupling piston actuating springs 20, or any other means of actuating the piston 20 known in the art.

With reference to FIG. 1, the tool unit 41 includes a housing 43, a head 45, an alignment post 47 and a fluid port 49. Both the head 45 and the alignment post 47 or the tool unit 41 function to align the master unit 1 and tool unit 41 as a robot arm moves the master unit 1 into contact with the tool unit 41. The head 45 includes an angled engagement surface 48 and a race 46. The race 46 substantially conforms to a shape of the coupling ball 18 of the coupling mechanism 3, allowing the tool unit 41 to be securely coupled to the master unit 1. The head 45 of the tool unit 41 couples the tool unit 41 to the base 11 of the detent piston 9 of the coupling mechanism 3. As depicted in FIGS. 3 and 4, as a robot arm moves the master unit 1 toward a tool unit 41, the head 45 of the tool unit 41 contacts and applies mechanical force to the base 11 of the detent piston 9.

FIG. 2 depicts a sectional view of the master unit 1 in a decoupled state. The coupling piston 13 is in a retracted, or unlocked position (down, as depicted in FIG. 2). This opens the coupling ball retaining area 25, allowing the coupling ball 18 to retract from the opening 5 in the coupling mechanism 3. To hold the coupling piston 13 in the unlocked position, against the bias of the coupling piston spring 20, the detent ball 17 is forced radially outward by the detent piston 9, where it engages with an angled locking surface 72 of the coupling piston 13. The detent piston 9 is in an extended, or locked position, driven by the detent piston spring 19. In this position, a holding surface 71 of the detent piston 9 is positioned against the piston ball 17, holding it outward against the angled locking surface 72 of the coupling piston 13, to maintain the coupling piston 13 in the unlocked position. This allows the master unit 1 to engage a tool unit 41.

A sensor 31 is configured to detect whether the master unit 1 is in the decoupled state or the coupled state. In one embodiment, the sensor 31 detects whether the detent piston 9 is in a locked position or an unlocked position to determine the state of the master unit 1. In another embodiment, the sensor 31 detects whether the coupling piston 13 is in a locked position or an unlocked position to determine the state of the master unit 1.

Referring again to FIG. 1, as a robot arm approaches a tool, the master unit 1 is brought into contact with a tool unit 41. Initially, the alignment post 47 will mate in the corresponding alignment receptacle 21, aiding in alignment of the master and tool units 1, 41. Additionally, the head 45 of the tool unit 41 will mate with the corresponding opening 5 in the coupling mechanism 3, and the fluid port 49 will mate with the fluid receptacle 23.

FIG. 3 depicts the master unit 1 as it engages a tool unit 41, as the robot arm is preparing to couple to a tool (moving upwardly as depicted in FIG. 3). An angled engagement surface 48 of the head 45 of the tool unit 41 is operative to urge the coupling ball 18 into the coupling ball retention area 26, clearing the opening 5 to accept the head 45. The head 45 is dimensioned and positioned so as to contact the base 11 of the detent piston 9 as the head 45 moves further into the opening 5 of the coupling mechanism 3. As the robot arm pushes the master unit 1 into contact with the tool unit 41, the head 45 presses the detent piston 9 toward an unlocked position (down, as depicted in FIG. 3), against the bias of the detent piston actuating spring 19.

FIG. 4 depicts the master unit 1 fully engaged with the tool unit 41, with the coupling mechanism 3 in the fully coupled state. As the robot arm moved the master unit 1 closer to the tool unit 41, the head 45 continued pressing the detent piston 9 toward the unlocked position (down, as depicted in FIGS. 3, 4), This moved the more narrow angled surface 52 of the detent piston 9 adjacent the detent ball 17, allowing the detent ball 17 to move inwardly into the detent ball retaining space 25, releasing the angled locking surface 72 of the coupling piston 13. This allowed the coupling piston 13 to move toward the locked position (up, as depicted in FIGS. 3, 4), under bias of the coupling piston actuating spring 20. A contact surface 74 of the coupling piston 13 engaged the coupling ball 18, urging it inwardly through aperture 8 in the side wall 7 of the opening 5. The coupling ball 18 mated against a conforming surface of the race 46 on the head 45 of the tool unit 41, and is pressed against the race 46 by a failsafe surface 73 of the coupling piston 13 (described in greater detail below), locking the tool unit 41 firmly to the master unit 1.

The coupling ball 18 is maintained in this position by the coupling piston 13, which is continuously biased toward the locked position by the coupling piston actuating spring 20. Only the second source of power—pneumatic fluid from a tool stand, provided by the fluid port 49 of the tool unit 41—can move the coupling piston 13 towards the unlocked position. This pressurized fluid is only available when a tool is safely disposed in the tool stand. Hence, the coupling of the master unit 1 to the tool unit 41 is inherently safe; the coupling mechanism 3 cannot physically decouple without the tool being in a tool stand.

FIG. 5 depicts the master unit 1 and tool unit 41, after the robot arm has deposited a tool in its tool stand. The coupling mechanism 3 has been actuated to a decoupled state, and the master unit 1 is disengaging with the tool unit 41. The coupling piston 13 has been moved to the unlocked position (down, as depicted in FIG. 5), against the bias of the coupling piston actuating spring 20, by pneumatic fluid from the tool stand, supplied by the tool unit 41 via fluid port 49. Once the coupling piston 13 reached the unlocked position, the coupling ball 18 was able to retract into the coupling ball retention area 26, thus disengaging the race 46 on the head 45 of the tool unit 41, allowing the head 45 to move partially out of the opening 5 in the coupling mechanism 3. As it did so, the detent piston 9 was allowed to move toward the locked position (up, as depicted in FIG. 5), under the bias of the detent piston actuating spring 19. As the detent piston 9 moves toward the locked position, an angled surface 52 of the detent piston 9 contacts the detent ball 17, forcing it outwardly to engage the angled locking surface 72 of the coupling piston 13, locking it in the unlocked position.

Note that, due to the size and placement of the head 45 and fluid port 49, the fluid port 49 continues to provide pneumatic pressure to the fluid receptacle 23, hence holding the coupling piston 13 in the unlocked position, while the head 45 moves partially out of the opening 5. This allows the detent piston 9 to rise sufficiently to lock the detent ball 17 outwardly against the angled locking surface 72 of the coupling piston 13 and lock the coupling piston 13 in the unlocked position, while the coupling piston 13 is still maintained in the unlocked position by tool-stand-provided pneumatic pressure. As the head 45 moves fully out of the opening 5, a holding surface 51 of the detent piston 9 contacts the detent ball 17.

Figure 6A:
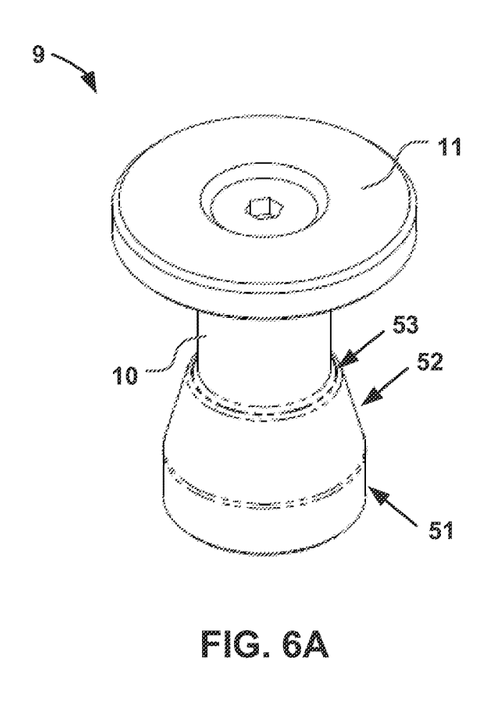
FIGS. 6A to 6D provide various views of the first piston of the master unit of FIGS. 1 to 5 in accordance with various aspects as described herein.
Figure 6B:
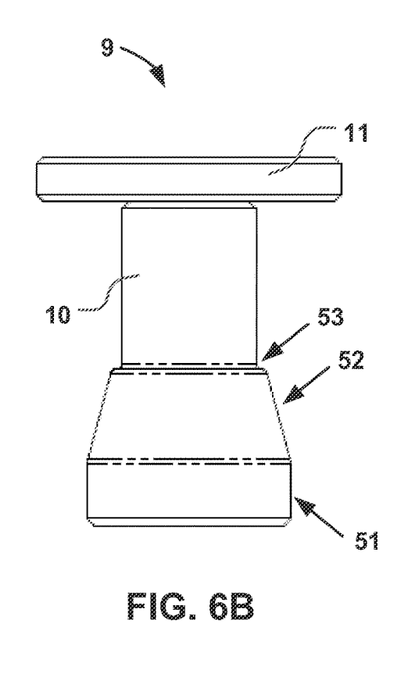
Figure 6C:
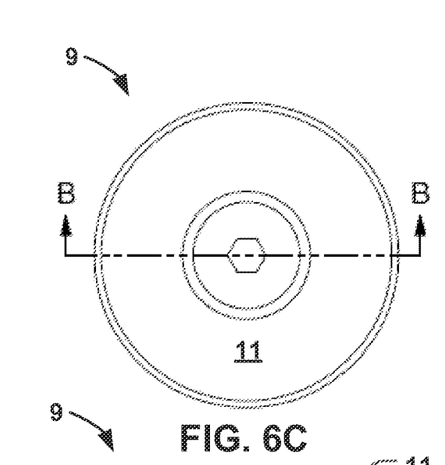
Figure 6D:
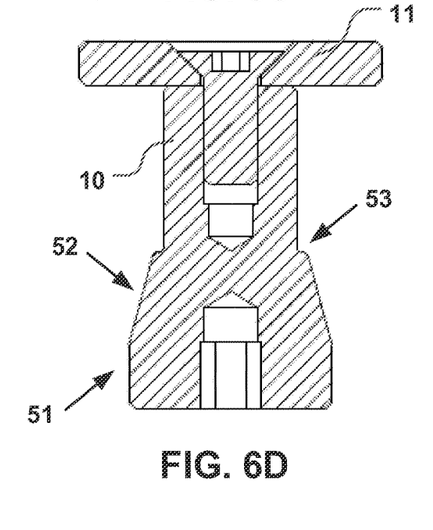

FIGS. 6A to 6D provide various views of the detent piston 9 of the master unit 1 depicted in FIGS. 1 to 5. FIG. 6A provides a perspective view of the detent piston 9. FIG. 6B provides a top view of the detent piston 9. FIG. 6C provides a side view of the detent piston 9. FIG. 6D provides a longitudinal cross-sectional view of the detent piston 9.

The detent piston 9 includes various functional angled surfaces. The detent piston 9 has a holding surface 51, and an angled surface 52. The holding surface 51 and the angled surface 52 are configured to engage and radially move the detent ball 17. When the detent piston 9 is in the unlocked position, as depicted in FIG. 4, the conical angled surface 52 contacts the detent ball at or near its most narrow width. As the master unit 1 moves away from the tool unit 41, as depicted in FIG. 5, the detent piston 9 moves toward the locked position (up, as depicted in the figures). The angled surface 52 of the detent piston 9 then engages and radially moves the detent ball 17 outwardly to engage an angled locking surface 72 of the coupling piston 13.

As the detent piston 9 continues to move to the fully locked position, the holding surface 51 contacts the detent ball 17 and presses it against the angled locking surface 72 of the coupling piston 13, so as to hold the coupling piston 13 in the unlocked position. This is necessary when the first power source, driving the coupling piston 13 toward the locked position, is a spring 20 that continuously applies force to the coupling piston 13. If the detent ball 17 did not hold the coupling piston 13 in the unlocked position, the coupling piston 13 would move to the locked position as soon as the master unit 1 moved away from the tool unit 41, preventing the master unit 1 from subsequently coupling to another tool unit 41.

The holding surface 51 is flat, or cylindrical—that is, without a conical taper or angle with respect to the axis of movement of the detent piston 9. As depicted in FIGS. 2 and 5, when the detent piston 9 is in the fully locked position (up, as depicted in the figures) the holding surface 51 engages the detent ball 17 and holds it outwardly extended, to hold the coupling piston 13 in the unlocked position. The holding surface is flat so that the force the detent ball 17 exerts on the detent piston 9 is normal to the axis of movement of the detent piston 9. That, no component of the force the detent ball 17 exerts on the detent piston 9 operates to urge the detent piston 9 towards the unlocked position (as would be the case if the detent ball 17 contacted the angled surface 52 in the locked position). A third surface 53 of the first piston 9 such as a ridge surface is configured to limit axial movement of the detent piston 9 through the aperture 8 of the opening 5.

Figure 7A:
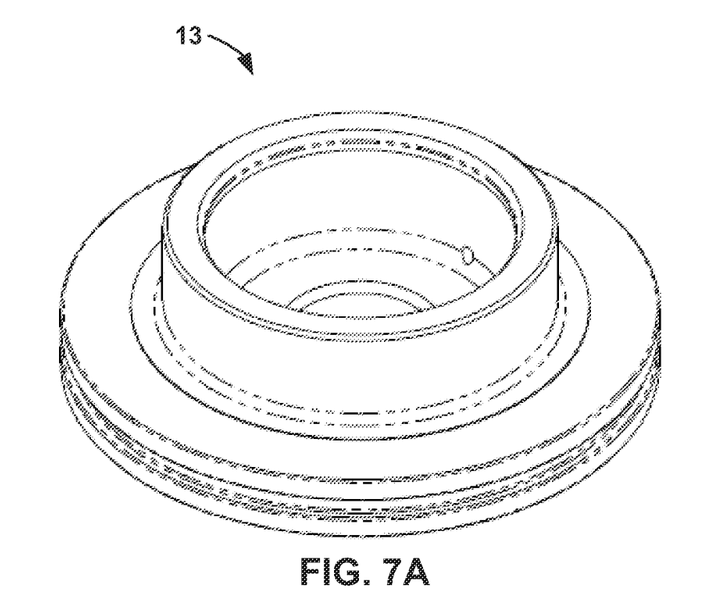
FIGS. 7A to 7D provide various views of the second piston of the master unit of FIGS. 1 to 5 in accordance with various aspects as described herein.
Figure 7B:
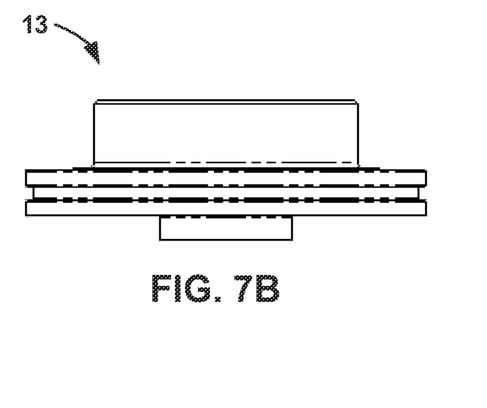
Figure 7C:
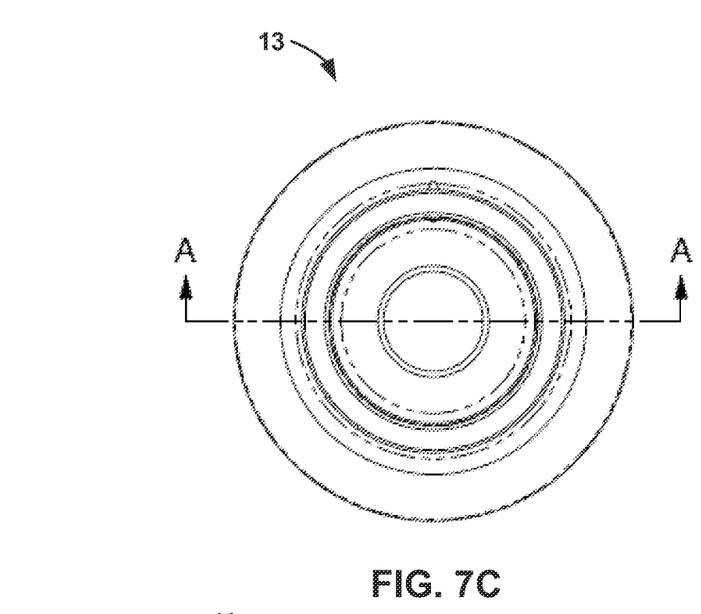
Figure 7D:
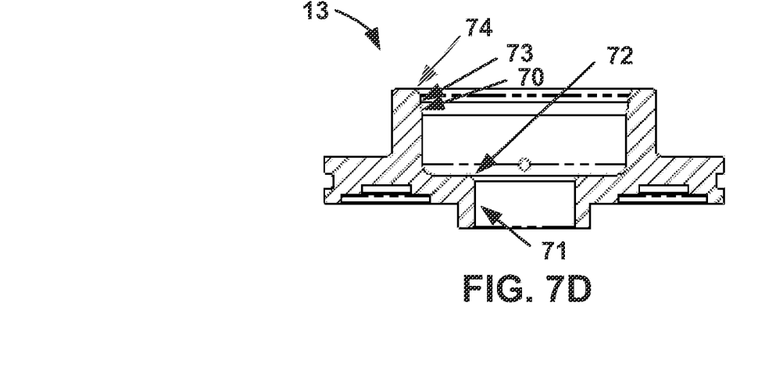

FIGS. 7A to 7D provide various views of the coupling piston 13 of the master unit 1 of FIGS. 1 to 5. FIG. 7A provides a perspective view of the coupling piston 13. FIG. 7B provides a top view of the coupling piston 13. FIG. 7C provides a side view of the coupling piston 13. FIG. 7D provides a longitudinal cross-sectional view of the coupling piston 13.

The coupling piston 13 includes various functional angled surfaces. The coupling piston 13 has a holding surface 71, an angled locking surface 72, coupling ball contact surface 73, tapered locking surface 70, and a failsafe surface 74 interposed between the coupling ball contact surface 73 and the tapered locking surface 70.

The holding surface 71 and angled locking surface 72 interact with the detent ball 17 when the coupling piston 13 is at or near the unlocked position. The holding surface 71 provides a backstop defining one end of the detent ball retention area 25 when the detent piston is in the unlocked position and the coupling piston 13 is in the locked position, as depicted in FIG. 4. The detent ball 17 engages the angled locking surface 72 of the coupling piston 13, to hold, or lock, the coupling piston 13 in the unlocked position when the master unit 1 moves away from the tool unit 41, as depicted in FIG. 2.

The coupling ball contact surface 74, failsafe surface 73, and tapered locking surface 70 interact with the coupling ball 18 when the coupling piston 13 is at or near the locked position. Upon coupling to a tool unit 41, the master unit 1 moves towards the tool unit, such that the head 45 of the tool unit 41 enters the opening 5 of the coupling mechanism 3, and presses the detent piston 9 toward the unlocked position, to release the coupling piston 13. This allows the coupling piston 13 to move toward the locked position (up, as depicted in FIGS. 2-5) under the bias of the coupling piston actuating spring 20. As the coupling piston 13 moves toward the locked position, the coupling ball contact surface 74 makes contact with the coupling ball 18, and urges it radially inward, into the opening 5 through aperture 8, behind the front edge of the head 45. The coupling ball 18 contacts a conforming race 46 formed in the head 45. It is the coupling piston 13 pressing the coupling ball 18 against the race 46 that securely locks the master unit 1 and tool unit 41 together.

After the coupling ball 18 is initially urged partially into the opening 5, as the coupling piston 13 moves to the fully locked position, the failsafe surface 73 moves past the coupling ball 18, and the locking taper surface 70 engages and holds the coupling ball 18 firmly against the race 46. In one embodiment, the failsafe surface 73 is a flat, or cylindrical, surface, similar to the holding surface 71. However, in another embodiment, to ensure that inadvertent forces, such as vibration and the like, cannot allow the coupling piston 13 to move away from the fully locked position if positive locking power is lost, the failsafe surface 73 includes at least a slight back angle. In one embodiment, the failsafe surface 73 is a slightly concave surface conforming to the coupling ball 18. In either embodiment, to move the coupling piston 13 away from the fully locked position, a decoupling force must not only overcome the bias of the coupling piston actuating spring 20, but must provide an additional force operative to press the coupling ball 18 even tighter against the race 46, to overcome the slight back angle or "lip" of the failsafe surface 73. Thus, even if the coupling piston actuating spring 20 were to break or otherwise completely fail (or if some other first power source, such as pneumatic pressure, were to fail), a positive force would be required to move the coupling piston 13 from the fully locked position. Hence, the master unit 1 fails in a safe condition, with the tool unit 41, and hence its attached tool, remaining firmly coupled.

Figure 8:
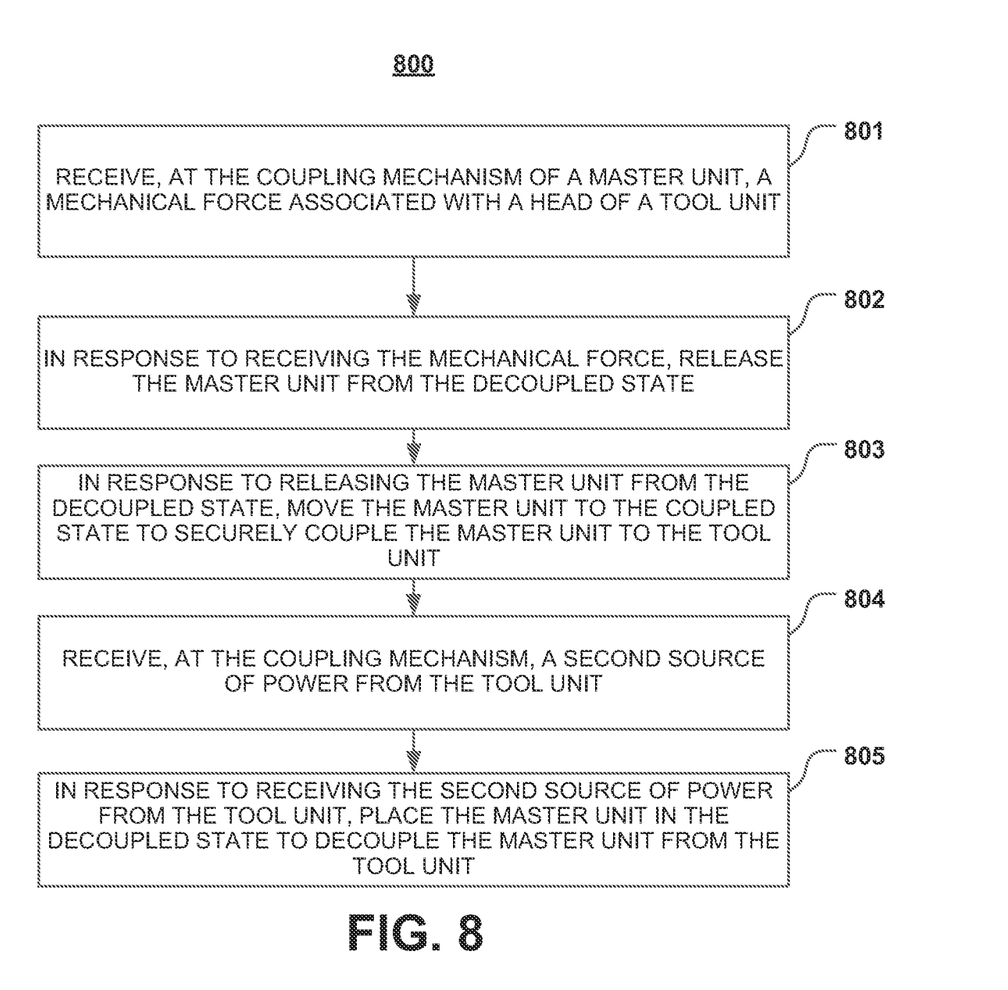
FIG. 8 illustrates one embodiment of a method by the master unit for placing the master unit in the coupled state and the decoupled state in accordance with various aspects as described herein.

FIG. 8 illustrates one embodiment of a method 800 of operating a master unit 1 of a robotic tool changer having a coupling mechanism 3 configured to place the master unit 1 in one of a coupled state and a decoupled state, the coupled state associated with the master unit 1 being securely coupled to a tool unit 41 of the robotic tool changer and the decoupled state associated with the master unit 1 being decoupled from the tool unit 41. The method 800 begins at block 801, when the coupling mechanism 3 of the master unit 1—assumed to be in the decoupled state—receives a mechanical force associated with a head 45 of a tool unit 41. The mechanical force may be generated by a robot arm, to which the master unit 1 is attached, moving the master unit 1 adjacent to, and into physical contact with, a tool unit 1 attached to a robotic tool disposed in a tool stand. At block 802, in response to receiving the mechanical force, the master unit 1 is released from the decoupled state. For example, the mechanical force may move the detent piston 9 towards its unlocked position, allowing detent balls 17, which hold the coupling piston 13 in the unlocked state against the bias of the coupling piston actuating spring, to release the coupling piston 13. At block 803, in response to the master unit 1 being released from the decoupled state, the master unit 1 moves to the coupled state to securely couple the master unit 1 to the tool unit 41. For example, the coupling piston 13 may move to the locked position under the bias of the coupling piston actuating spring 20.

With the tool securely attached, the robot arm may remove the tool from its tool stand, and perform various tasks. Upon completion of such tasks, the robot arm may return the tool to a tool stand, from which the tool unit 41 receives a second source of power, such as pneumatic fluid, which it can pass to the master unit 1. In block 804, the coupling mechanism 3 receives a second source of power from the tool unit 41, such as pneumatic fluid via the fluid port 23. At block 805, in response to receiving the second source of power from the tool unit 41, the master unit 1 is placed in the decoupled state to decouple the master unit 1 from the tool unit 41. For example, the coupling piston 13 may move from the locked position to the unlocked position via pneumatic pressure overcoming the bias of the coupling piston actuating spring 20, and be locked into the unlocked position by the detent ball 17 engaging the angled surface 72 as the detent piston 9 moves towards the locked position, as the head 45 moves out of the opening 5 in the coupling mechanism 3.

Figure 9:
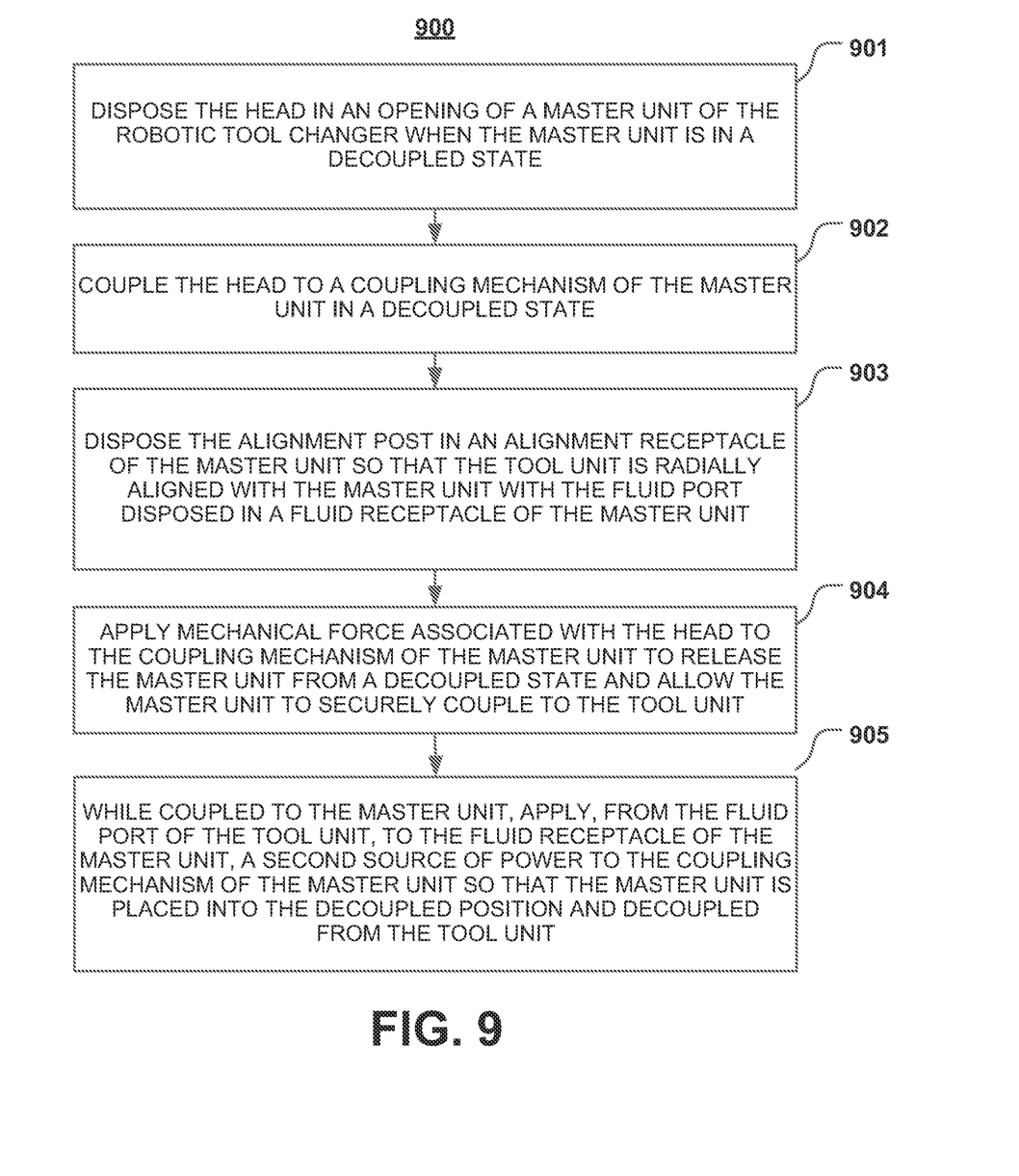
FIG. 9 illustrates another embodiment of a method by the tool unit for placing the master unit in the coupled state and the decoupled state in accordance with various aspects as described herein.

FIG. 9 illustrates one embodiment of a method 900 of operating a tool unit 41 of a robotic tool changer having a head 45, an alignment post 47 and a fluid port 49. The method 900 begins when a robot arm moves an attached master unit 1—having a coupling mechanism 3 assumed to be in the decoupled state—into contact with the tool unit 41, which is attached to a robotic tool disposed in a tool stand. At block 901, the head 45 of the tool unit 41 is disposed in an opening 5 of a master unit 1 of the robotic tool changer when the master unit 1 is in a decoupled state. At block 902, the head 45 couples to a coupling mechanism 3 of the master unit 1, which may for example comprise the head 45 abutting the detent piston 9. At block 903, the alignment post 47 is disposed in an alignment receptacle 21 of the master unit 1 so that the tool unit 41 is radially aligned with the master unit 1, with the fluid port 49 disposed in a fluid receptacle 23 of the master unit 1. At block 904, as the master unit 1 continues to move closer to the tool unit 41, mechanical force associated with the head 45 is applied to the coupling mechanism 3 of the master unit 1 to release the master unit 1 from a decoupled state and allow the master unit 1 to securely couple to the tool unit 41. For example, the head 45 may move the detent piston 9 toward its unlocked position, allowing the detent ball 17 to disengage the angled surface 72 of the coupling piston 13, allowing the coupling piston 13 to move towards the locked position under the bias of the coupling piston actuating spring 20.

With the tool securely attached, the robot arm may remove the tool from its tool stand, and perform various tasks. Upon completion of such tasks, the robot arm may return the tool to a tool stand, from which the tool unit 41 receives a second source of power, such as pneumatic fluid, which it can pass to the master unit 1. At block 905, while coupled to the master unit 1, a second source of power is applied from the fluid port 49 of the tool unit to the fluid receptacle 23 of the master unit 1, and thence to the coupling mechanism 3 of the master unit 1 so that the master unit 1 is placed into the decoupled state and decoupled from the tool unit 41. For example, the second source of power may comprise pneumatic fluid only available to the tool unit 41 when the attached tool is safely disposed in a tool stand.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices and systems, described herein are in conjunction with a configuration for the aforementioned robotic tool changer, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. A robotic tool changer, comprising:
   a master unit including a coupling mechanism configured to place the master unit in one of a coupled state and a decoupled state, the coupling mechanism including
   a coupling piston movably mounted within the coupling mechanism, the coupling piston being moved toward a locked state by a first source of power to place the coupling mechanism in the coupled state, and being moved toward an unlocked state by a different second source of power to place the coupling mechanism in the decoupled state;
   a coupling ball displaced by the coupling piston in the locked state to cause the master unit to securely mechanically attach to a tool unit of the robotic tool changer if the tool unit is physically proximate the master unit, and allowed by the coupling piston to retract in the unlocked state to detach the master unit from the tool unit;
   a detent piston movably mounted within the coupling mechanism, the detent piston being biased toward a locked position and operative to assume the locked position when the coupling piston is in the unlocked state; and
   a detent ball, distinct from the coupling ball, displaced by the detent piston in the locked position to hold the coupling piston in the unlocked state;
   wherein the second source of power is received from a tool unit only when a robotic tool attached to the tool unit is disposed in a tool stand; and
   wherein the detent piston is moved to an unlocked position, against the bias, in response to physical contact with the tool unit; and
   a tool unit including
   a head configured to couple to the coupling mechanism of the master unit so as to apply mechanical force to the detent piston, moving the detent piston to the unlocked position to release the coupling piston from the unlocked state and allow it to couple to a tool unit;
a fluid port configured to couple to a fluid receptacle of the master unit so as to apply the second source of power to the coupling mechanism.

2. The robotic tool changer of claim 1, wherein the coupling mechanism is further configured to include:
a housing having an opening, wherein the opening includes a floor and a sidewall;
wherein the detent piston includes a stem and a base coupled to a first end of the stem, and the stem is capable of axially moving through an aperture in the floor of the opening.

3. The robotic tool changer of claim 2, wherein the detent piston further includes a ridge surface at a second end of the stem to limit axial movement of the first piston through the aperture at the floor of the opening.

4. The robotic tool changer of claim 1, wherein the coupling mechanism is further configured to include:
a detent piston actuating spring operationally coupled to the detent piston and capable of axial movement, wherein the detent piston actuating spring is configured to bias the detent piston towards the locked position.

5. The robotic tool changer of claim 4, wherein the detent piston is moved to an unlocked position in response to mechanical force exerted by the head of the tool unit being greater than the detent piston actuating spring force.

6. The robotic tool changer of claim 1, wherein the first source of power comprises one or more coupling piston actuating springs configured to bias the coupling piston towards the locked state.

7. The robotic tool changer of claim 6, wherein the coupling piston is moved to the unlocked state in response to the second source of power being greater than a total coupling piston actuating spring force.

8. The robotic tool changer of claim 1, wherein the coupling mechanism is further configured to include:
a detent ball retention area disposed between the detent piston and the coupling piston;
wherein the detent ball is disposed in the detent ball retention area;
wherein the detent piston has at least one angled surface configured to engage and radially move the detent ball to engage an angled retention surface of the coupling piston so as to hold the coupling piston in the unlocked position.

9. The robotic tool changer of claim 1, wherein the coupling mechanism is further configured to include:
an opening having a floor and a sidewall;
a coupling ball retention area disposed between the coupling piston and the sidewall of the opening;
wherein the coupling ball is operationally coupled to the coupling piston and disposed in the coupling ball retention area;
wherein the coupling piston has an angled surface for engaging and radially moving the coupling ball;
wherein the angled surface of the coupling piston engages and radially moves the coupling ball to a position such that the coupling ball partially extends through an aperture of the sidewall to engage a race of the head of the tool unit disposed in the opening, thus coupling the master unit to the tool unit.

10. The robotic tool changer of claim 1,
wherein the fluid receptacle is operationally coupled to the coupling piston and is configured to:
receive, from the fluid port of the tool unit, the second source of power; and
output, to the coupling piston, the second source of power.

11. The robotic tool changer of claim 1, further comprising:
an alignment post in one of the master and tool units, and an alignment receptacle in the other of the master and tool units, the alignment post and receptacle configured to radially align the tool unit to the master unit as the master unit moves to couple to the tool unit, so that the fluid port of the tool unit is disposed in the fluid receptacle of the master unit.

12. The robotic tool changer of claim 1, further comprising:
a sensor operationally coupled to the coupling mechanism and configured to detect that the coupling mechanism is in one of the coupled state and the decoupled state.

13. The robotic tool changer of claim 12,
wherein the sensor is operationally coupled to at least one of the detent piston and the coupling piston.

14. The robotic tool changer of claim 1 wherein the head includes a circumferential race shaped and operative to mate with one or more coupling balls in the master unit, wherein the force of the coupling balls pressing against the race is operative to couple the tool unit to the master unit.

15. The robotic tool changer of claim 1 wherein the second source of power comprises pneumatic fluid received from a tool stand only when the tool attached to the tool unit is disposed in the tool stand.

* * * * *